(12) United States Patent
Araki et al.

(10) Patent No.: US 7,889,154 B2
(45) Date of Patent: Feb. 15, 2011

(54) LIQUID CRYSTAL DISPLAY APPARATUS AND DRIVING METHOD

(75) Inventors: Shigesumi Araki, Kanazawa (JP);
Kazuhiro Nishiyama, Kanazawa (JP);
Mitsutaka Okita, Hakusan (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 137 days.

(21) Appl. No.: 11/828,067

(22) Filed: Jul. 25, 2007

(65) Prior Publication Data
US 2008/0074592 A1 Mar. 27, 2008

(30) Foreign Application Priority Data

Jul. 26, 2006 (JP) ............................... 2006-203861
Jul. 11, 2007 (JP) ............................... 2007-182425

(51) Int. Cl.
G09G 3/20 (2006.01)
G09G 3/36 (2006.01)
G09G 5/00 (2006.01)
G06F 3/038 (2006.01)

(52) U.S. Cl. ............................. 345/55; 345/204; 345/87
(58) Field of Classification Search ................. 345/204, 345/207, 690–693, 87–103
See application file for complete search history.

(56) References Cited

U.S. PATENT DOCUMENTS

| | | | | |
|---|---|---|---|---|
| 6,496,177 B1 * | 12/2002 | Burton | ........................ | 345/101 |
| 6,563,554 B2 * | 5/2003 | Okamoto et al. | ............... | 349/12 |
| 7,324,933 B2 * | 1/2008 | Shen et al. | ..................... | 703/21 |
| 2005/0174514 A1 * | 8/2005 | Iijima | ......................... | 349/109 |
| 2005/0219187 A1 * | 10/2005 | Shih | ............................ | 345/94 |
| 2006/0007194 A1 * | 1/2006 | Verschueren et al. | ........ | 345/204 |
| 2007/0091056 A1 | 4/2007 | Okita et al. | | |
| 2007/0120809 A1 | 5/2007 | Araki et al. | | |
| 2007/0242014 A1 * | 10/2007 | Lee et al. | ....................... | 345/88 |

FOREIGN PATENT DOCUMENTS

JP 2005-62573 3/2005

OTHER PUBLICATIONS

U.S. Appl. No. 11/551,061, filed Oct. 19, 2006, Okita, et al.
U.S. Appl. No. 11/564,542, filed Nov. 29, 2006, Araki, et al.
U.S. Appl. No. 12/121,413, filed May 15, 2008, Higano et al.

* cited by examiner

Primary Examiner—Alexander S. Beck
(74) Attorney, Agent, or Firm—Oblon, Soivak, McClelland, Maier & Neustadt, L.L.P.

(57) ABSTRACT

A liquid crystal display apparatus includes a display panel configured to be formed by arranging pixels like a matrix, a light source configured to light the display panel, and a driving control means for controlling the display panel, wherein the pixels are transreflective type liquid crystal pixels having a reflective part and a transmissive part driven independently, and the driving control means is configured to separately control non-image periods of the reflective part and transmissive part.

16 Claims, 8 Drawing Sheets

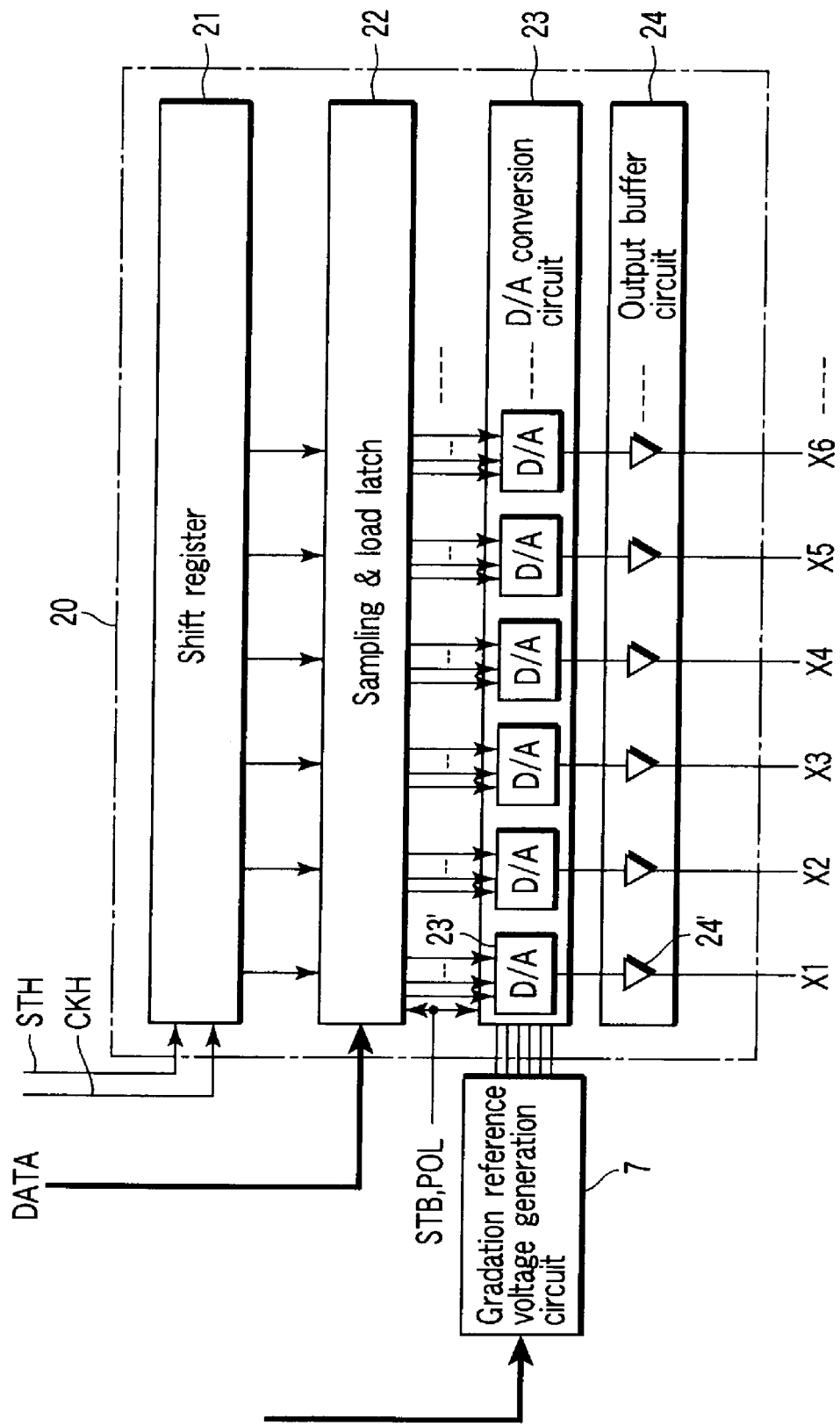
F I G. 2

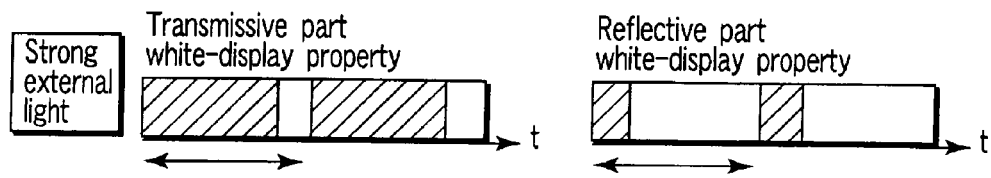
FIG. 5A
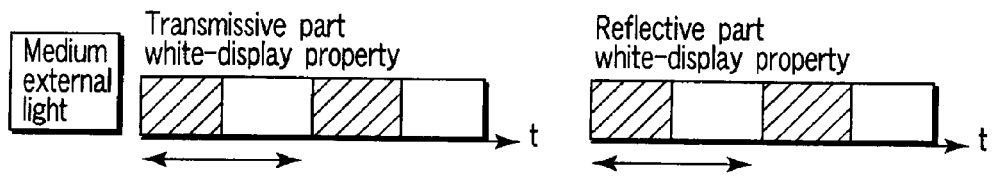
FIG. 5B
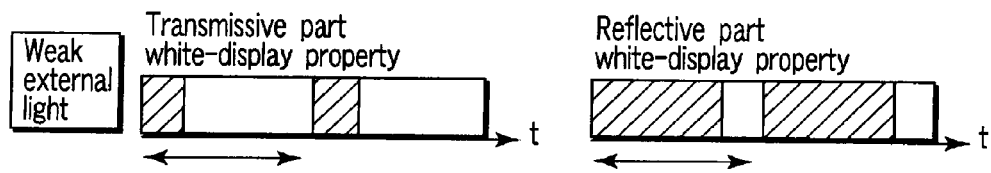
FIG. 5C
| External light intensity I | Transmissive part black insertion ratio At | Reflective part black insertion ratio Ar |
|---|---|---|
| $I_1$ | $At_1$ | $Ar_1$ |
| $I_2$ | $At_2$ | $Ar_2$ |
| ⋮ | ⋮ | ⋮ |
| $I_i$ | $At_i$ | $Ar_i$ |
| ⋮ | ⋮ | ⋮ |
FIG. 6

LIQUID CRYSTAL DISPLAY APPARATUS AND DRIVING METHOD

CROSS-REFERENCE TO RELATED APPLICATIONS

This application is based upon and claims the benefit of priority from prior Japanese Patent Applications No. 2006-203861, filed Jul. 26, 2006; and No. 2007-182425, filed Jul. 11, 2007, the entire contents of both of which are incorporated herein by reference.

BACKGROUND OF THE INVENTION

1. Field of the Invention

The present invention relates to a liquid crystal display apparatus and driving method, and in particular to a transreflective type liquid crystal display apparatus and driving method, which is excellent particularly in moving image visibility and capable of realizing excellent display images without depending on ambient illuminance.

2. Description of the Related Art

A flat-panel display device represented by a liquid crystal display apparatus is characterized by light weight, thinness and low power consumption, and widely used as a display device in a personal computer, portable information terminal, television or car navigation system.

In the liquid crystal display apparatus, a plurality of pixels is arranged like a matrix, and light transmittance of each pixel is controlled, whereby images are displayed. Therefore, the liquid crystal display apparatus is available in transmissive, reflective and transreflective types according to light-use modes.

A transmissive type liquid crystal apparatus has a lighting device called a backlight in the rear of a display panel, and its light-transmission amount is controlled for displaying images. In this transmissive type liquid crystal display method, good images can be displayed even in dark places with less ambient light. However, in places with bright ambient light, like outdoors, brightness is insufficient and display visibility is lowered.

Contrarily, in a reflective type liquid crystal apparatus, ambient light around a display device is reflected inside a display panel, and the reflection amount is controlled, whereby images are displayed. Therefore, the reflective type is suitable for use in places with bright ambient light, like outdoors, but displayed images are difficult to recognize in dark places with less ambient light.

In a transreflective type liquid crystal apparatus, a reflective part to display images by reflecting ambient light and a transmissive part to display images by transmitting backlight light are provided in one pixel. Therefore, the transmissive display function and reflective display function are compatible, and excellent display is realized without depending on ambient illuminance (Jpn. Pat. Appln. KOKAI Publication No. 2005-62573).

In the field of liquid crystal televisions and cellular phones, attention has been given to an OCB mode (Optically Compensated Bend Mode) liquid crystal display panel, which has a quick LCD response required for displaying images, and is capable of realizing a wide viewing angle.

In the OCB mode liquid crystal display panel, it is necessary to transit the liquid crystal alignment from the splay alignment to the bend alignment when displaying images. Therefore, a relatively large electric field is applied to the liquid crystal when power is turned on. However, this liquid crystal alignment is characterized to reversely transit to the splay alignment even after once transited to the bend alignment, when a voltage-applied state in which the energy of the splay alignment and the bend alignment is lower than a competitive level, or a no-voltage-applied state is continued for a long time.

For prevention of the reverse transition from the bend alignment to the splay alignment, there is a known driving method which applies a large voltage to the liquid crystal for each frame for displaying a 1-frame image. For example, in a normally-white liquid crystal display panel, this voltage corresponds to a pixel voltage that becomes black display, and black display is inserted with a predetermined ratio. This is known as black insertion driving. Black insertion driving also mitigates the sense of afterimage that occurs in display of moving images, by discrete impulse response of luminance.

BRIEF SUMMARY OF THE INVENTION

According to a first aspect of the invention, there is provided a liquid crystal display apparatus comprising: a display panel configured to be formed by arranging pixels like a matrix; a light source configured to light the display panel; and a driving control means for controlling the display panel, wherein the pixels are transreflective type liquid crystal pixels having a reflective part and a transmissive part driven independently, and the driving control means is configured to separately control non-image periods of the reflective part and transmissive part.

According to a second aspect of the invention, there is provided a liquid crystal display apparatus comprising: a display panel configured to be formed by arranging pixels like a matrix; a light source configured to light the display panel; and a driving control means for controlling the display panel, wherein the pixels are transreflective type OCB liquid crystal pixels having a reflective part and a transmissive part driven independently, and the driving control means is configured to separately control black insertion ratios of the reflective part and transmissive part.

According to a third aspect of the invention, there is provided a method of driving a liquid crystal display apparatus which includes: a display panel configured to be formed by arranging transreflective type liquid crystal pixels having a reflective part and a transmissive part; a light source configured to light the display panel; and a driving control means for controlling the display panel, comprising: driving the reflective part and transmissive part independently, and controlling non-image periods of the reflective part and transmissive part separately.

Additional objects and advantages of the invention will be set forth in the description which follows, and in part will be obvious from the description, or may be learned by practice of the invention. The objects and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a schematic view of a configuration of a source driver;

FIG. 5A is a view explaining display operation of a liquid crystal display apparatus according to an embodiment of the present invention;

FIG. 5B is a view explaining display operation of a liquid crystal display apparatus according to an embodiment of the present invention;

FIG. 5C is a view explaining display operation of a liquid crystal display apparatus according to an embodiment of the present invention;

FIG. 6 shows the contents of a black insertion rate setting table;

DETAILED DESCRIPTION OF THE INVENTION

Embodiment 1

Hereinafter, explanation will be given on a transreflective type OCB liquid crystal display apparatus (hereinafter, called a liquid crystal display apparatus) according to a first embodiment of the invention, with reference to the accompanying drawings.

Figure 1:
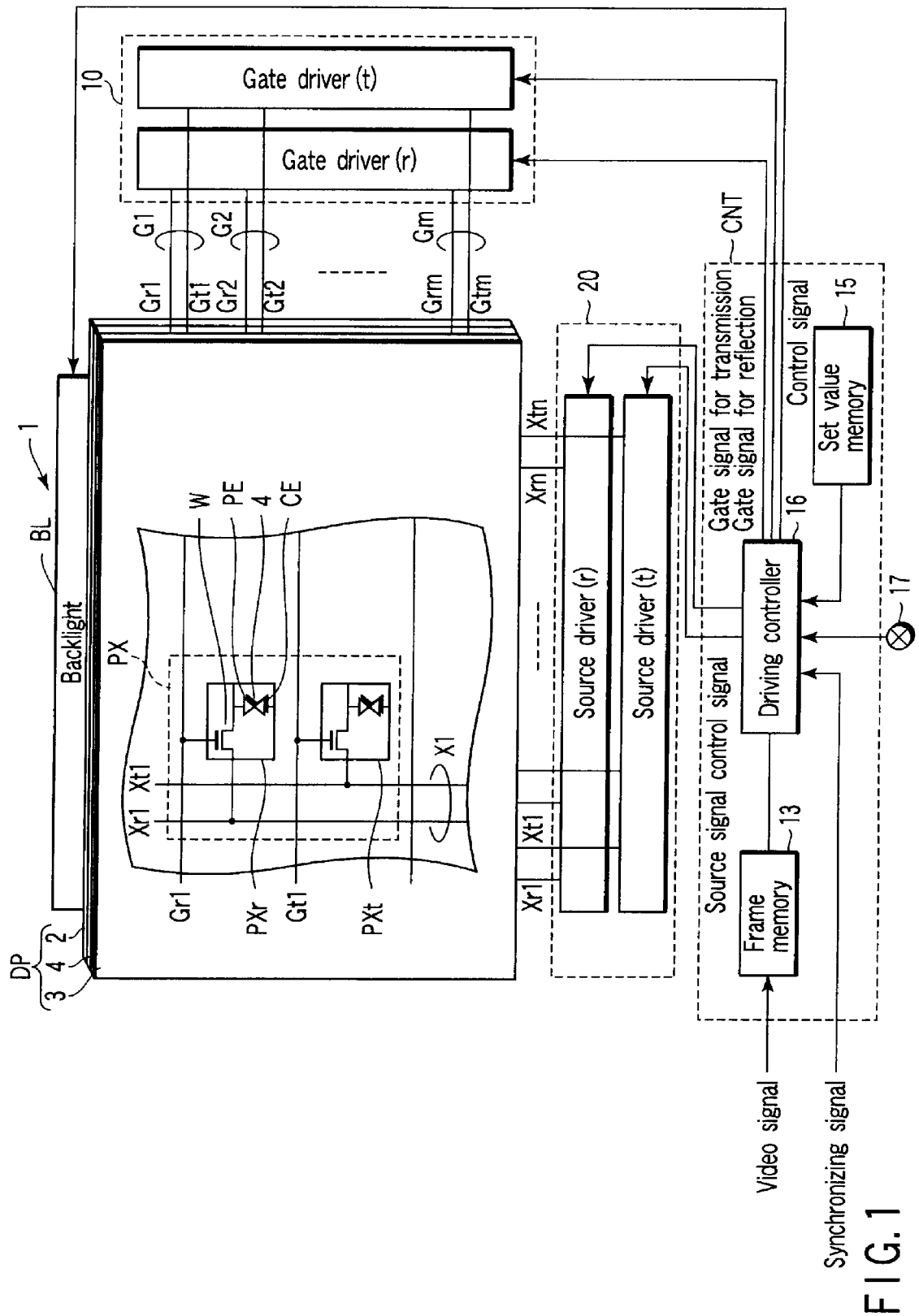
FIG. 1 is a schematic view of a circuit configuration of a liquid crystal display apparatus.
Figure 3:
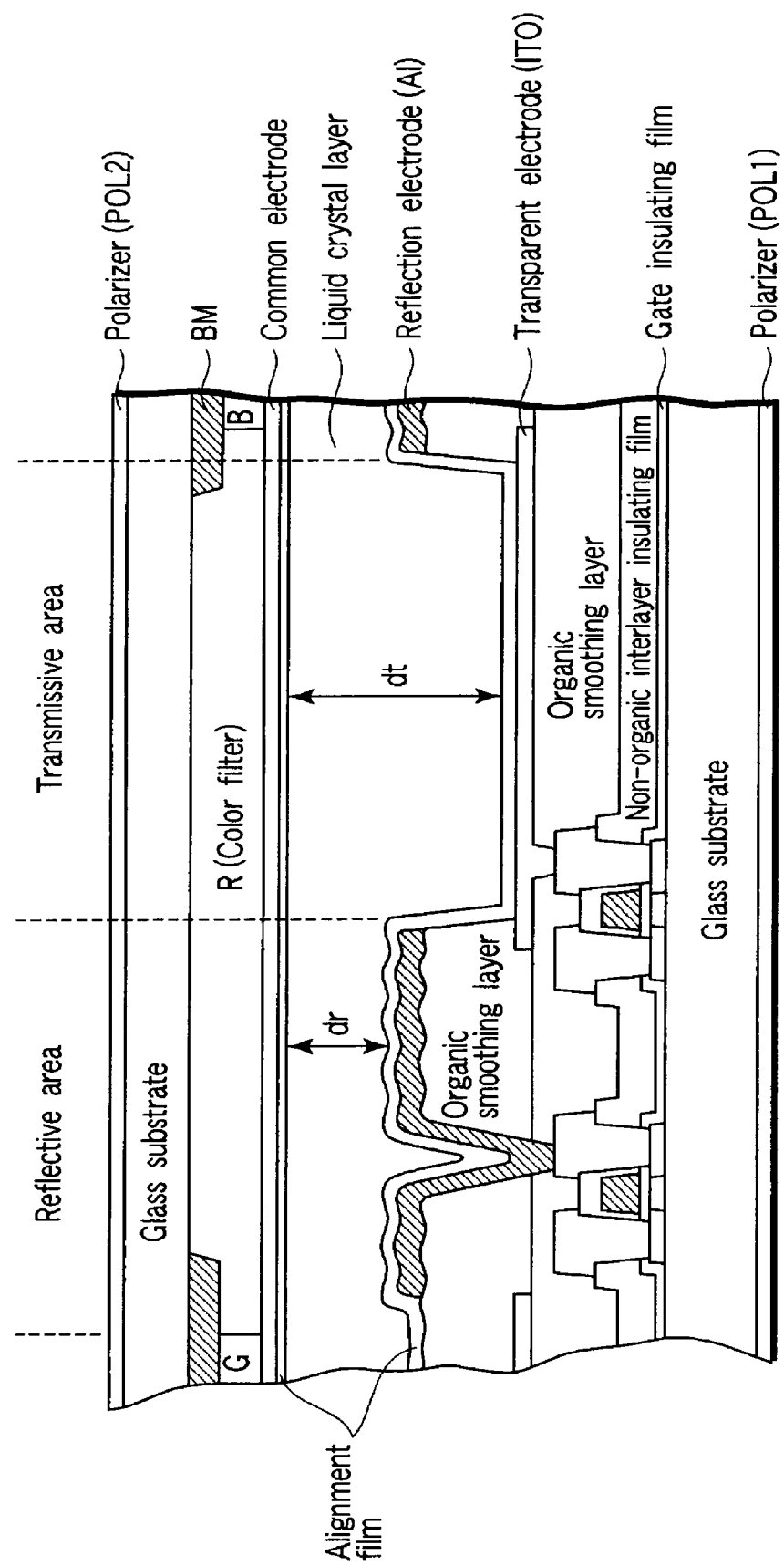
FIG. 3 is a partial schematic sectional view of a liquid crystal display panel.

FIG. 1 is a schematic view of the circuit configuration of a liquid crystal display apparatus 1. FIG. 3 is a partial schematic sectional view of a liquid crystal display panel DP of FIG. 1.

The liquid crystal display apparatus 1 has a liquid crystal display panel DP on which OCB liquid crystal pixels PX are arranged, a display control circuit CNT which controls the liquid crystal display panel DP, and a backlight BL which illuminates the liquid crystal display panel DP. The liquid crystal display panel DP is constructed to have a liquid crystal layer 4 between an array substrate 2 and a counter-substrate 3.

The OCB liquid crystal pixel PX is a transreflective type liquid crystal pixel. Each display pixel is configured as a pair of reflective pixels PXr arranged in an odd line of the liquid crystal display panel DP, and transmissive pixels PXt arranged in an even line. Namely, the transmissive part and reflective part of the OCB liquid crystal pixel PX are configured electrically independent in one pixel.

The display control circuit CNT controls the transmissivity (reflectivity) of the liquid crystal display panel DP by changing the liquid crystal driving voltage applied from the array substrate 2 and counter-substrate 3 to the liquid crystal layer 4.

The array substrate 2 has pixel electrodes PE, gate lines G (G1-Gm), source lines X (X1-Xn), a pixel switching element W, a gate driver 10, and a source driver 20. Each gate line G consists of a gate line for transmission display Gt and a gate line for reflection display Gr. Each source line X consists of a transmission source line Xt, and a reflection source line Xr.

The pixel electrode PE is arranged like a matrix on a transparent insulating substrate such as glass. The gate line G is arranged along the rows of pixel electrodes PE. The gate line for transmission display Gt and gate line for reflection display Gr drive the transmissive pixel PXt and reflective pixel PXr electrically independent of each other. The transmission source line X (X1t-Xnt) and reflection source line X (X1r-Xnr) are arranged along the columns of pixel electrodes PE, and electrically connected to the corresponding transmissive pixels PXt and reflective pixels PXr through a pixel switching element W. The pixel switching element W is arranged close to the crossing position of these gate lines G and source lines X. The gate driver 10 sequentially drives the gate lines G. The source driver 20 drives the source lines X while the gate lines G are being driven.

The pixel switching element W is composed of a polysilicon thin-film transistor, for example. In this case, a gate of the thin-film transistor is connected to one gate line G, and the source and drain path are connected between one source line X and one pixel electrode PE.

The gate driver 10 is configured by using a polysilicon thin-film transistor formed in the same process of forming the pixel switching element W. The source driver 20 is an integrated circuit (IC) chip that is mounted on the array substrate 2 by the COG (Chip On Glass) technique. The source driver 20 may be configured by using a polysilicon thin-film transistor, like the gate driver 10.

The counter-substrate 3 includes a color filter (not shown) that is arranged on a transparent insulating substrate such as glass, and composed of red, green and blue colored layers opposite to the pixel electrodes PE, and a common electrode CE that is arranged on the color filter and opposite to the pixel electrodes PE.

The pixel electrode PE and common electrode CE constituting the transmissive pixel PXt are made of a transparent electrode material such as ITO, and the liquid crystal molecule alignment of the liquid crystal layer 4 arranged between the pixel electrode PE and common electrode CE is controlled according to the electric field between the pixel electrode PE and common electrode CE. The pixel electrode PE constituting the reflective pixel electrode PXr is made of a reflective electrode material such as aluminum, and the liquid crystal molecule alignment of the liquid crystal layer 4 arranged between the pixel electrode PE and common electrode CE is controlled according to an electric field between the pixel electrode PE and common electrode CE. The pixel electrode PE, common electrode CE and pixel area of the liquid crystal layer 4 constitute the OCB liquid crystal pixel PX.

The display control circuit CNT has a frame memory 13, a set value memory 15, a driving controller 16, and an external light sensor 17. The external light sensor 17 may be provided on and as one body with the array substrate 2 constituting the liquid crystal display panel DP. In particular, the external sensor can be configured by forming a PIN diode in the peripheral area on the array substrate 2, by the same process of forming the pixel switching element W.

The frame memory 13 saves display signals extracted from digital video signals. The driving controller 16 sequentially outputs a source signal and a control signal generated from the display signals saved in the frame memory 13, based on a synchronizing signal input from an external signal source (not shown). The source signal generated by the driving controller 16 is a display signal for the transmissive pixel PXt and reflective pixel PXr, and converted to include a black signal for black insertion. The driving controller 16 generates a gate signal as a control signal for the gate driver 10, based on a synchronizing signal input from an external signal source. The driving controller 16 outputs a synchronizing signal to control blinking of the backlight BL, based on a synchronizing signal input from an external signal source.

The external light sensor 17 measures the intensity of external light around the liquid crystal display apparatus. The set value memory 15 saves the black insertion ratios for the transmissive pixel PXt and reflective pixel PXr defined according to the external light intensity, as set data.

The gate driver 10 drives the gate lines G1-Gm to make switching elements W conductive for units of rows. The source driver 20 outputs a pixel voltage to the source lines X1-Xn, in the period that each switching element W is made conductive by driving the corresponding gate line G. The driving controller 16 performs black insertion conversion for an externally input video signal, and controls the operation timing of the gate driver 10 and source driver 20 for the conversion result.

FIG. 2 is a schematic diagram showing the configuration of a source driver.

The source driver 20 is composed of a source driver for driving a reflective type liquid crystal, and a source driver for driving a transmissive type liquid crystal. These source drivers have substantially the same configuration. Therefore, in the following description on the source drivers, the configuration and operation will be explained without discriminating the reflective and transmissive type liquid crystal drivers.

A control signal CTX is supplied from the driving controller 16 to the source driver 20, and used to assign display signal data as a video signal or a non-video signal for the pixels PX of one line, to source lines X. The control signal CTX includes a horizontal start signal STH, a horizontal clock signal CKH, a strobe signal STB, and a polarity signal POL. The horizontal start signal STH is a pulse generated at every predetermined period. The horizontal clock signal CKH is a pulse generated for the number of source lines in each predetermined period. The strobe signal STB is a pulse generated with a delay of predetermined time after the start signal STH. The strobe signal STB is used to output a pixel voltage as a conversion result of display signal data to the pixels PX of one line, parallel to the source lines X1-Xn. The polarity signal POL is a signal for reversing the polarity of the pixel voltage at every 1-horizontal scanning period and 1-vertical scanning period.

The source driver 20 includes a shift register 21, a sampling & load latch 22, a digital/analog (D/A) conversion circuit 23, and an output buffer circuit 24.

The shift register 21 shifts the horizontal start signal STH, synchronizing with the horizontal clock signal CKH, and controls the timing of sequential series-parallel conversion of the display signal data. The sampling & load latch 22 sequentially latches the display signal data for the pixels PXt and PXr of one line by the control of the shift register 21, and outputs them in parallel. The digital/analog (D/A) conversion circuit 23 converts the display signal data to analog pixel voltage. The output buffer circuit 24 outputs the analog pixel voltage obtained from the D/A conversion circuit 23, to the source lines X1-Xn.

The above-explained operations of the gate driver 10 and source driver 20 are executed for the non-video signals of one frame for black insertion, and video signals of one frame. By changing the holding period of pixel voltage corresponding to the video signals with respect to the holding period of pixel voltage corresponding to the non-video signals for black insertion, based on the set data of the set value memory 15, the black insertion ratio as the ratio of the holding period of the pixel voltage corresponding to the non-video signal for 1-frame period can be changed with respect to the pixels PXt and PXr.

As shown in FIG. 3, the liquid crystal display panel DP has a second polarizer POL 2 arranged on one outside surface of the liquid crystal display panel DP, and a first polarizer POL 1 arranged on the other outside surface of the liquid crystal display panel DP. On the rear side of the liquid crystal display panel DP, the backlight BL is provided to light the liquid crystal display panel DP.

The first and second polarizers POL 1 and POL 2 used here have an absorption axis and a transmission axis that intersect each other in a plane orthogonal to a light advancing direction. Such polarizers take out light having a plane of vibration in one direction parallel to the transmission axis, that is, light having the polarized state of a linearly polarized light.

Figure 4:
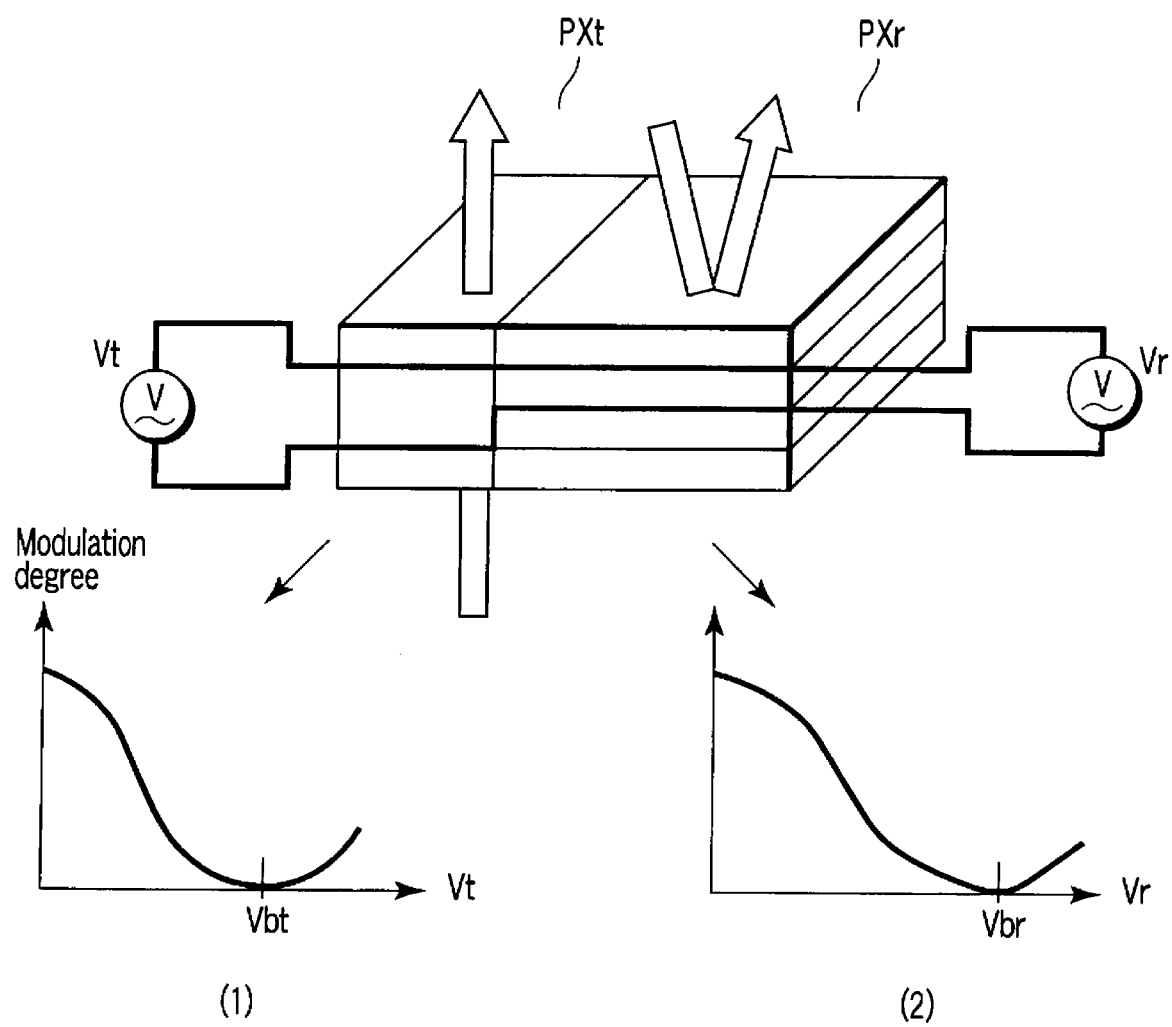
FIG. 4 shows the modulation degrees of a transmissive part and a reflective part.

FIG. 4 shows the modulation degrees of a transmissive part and a reflective part.

In the transmissive part, the light from the backlight BL passes through the first polarizer POL 1, liquid crystal panel DP, and second polarizer POL 2. In this optical path, the modulation degree is designed to become maximum in the part close to 0V, as shown in FIG. 4 (1).

In the reflective part, ambient light travels through the second polarizer POL 2, liquid crystal display panel DP, and second polarizer POL 2. Therefore, by setting the cell gap dr of the reflective part shown in FIG. 3 to about half the size of the cell gap dt of the transmissive part, the modulation degrees of the reflective part and transmissive part can be made almost the same. FIG. 4 (2) shows the modulation degree of the reflective part.

However, the modulation degrees of the reflective part and transmissive part need not to be the same. The reflective part and transmissive part may have their own modulation degrees.

A retardation value can be changed by changing the cell gaps dr and dt. When the retardation value is changed, the modulation degree is also changed as a result, and the modulation degree can be changed by adjusting the cell gap.

As shown in FIG. 4, it is possible to give a voltage independently to the pixel transmissive part and reflective part of the liquid crystal display apparatus.

If the modulation degrees can be made the same, the configuration of the driving circuit can be shared. Even if the modulation degrees cannot be made the same, a wide viewing angle can be obtained without sacrificing the optical properties by adjusting the voltage independently to meet the characteristics of the reflective part and transmissive part.

FIGS. 5A, 5B and 5C are diagrams showing the displaying operation of the liquid crystal display apparatus according to an embodiment of the invention. In FIGS. 5A, 5B and 5C, a white part indicates an image display period, and a hatched part indicates a non-image display period (black insertion period).

In this embodiment, black insertion driving is performed in both transmissive part and reflective part. In this time, the black insertion ratios of the transmissive part and reflective part are selected according to the external light intensity, and appropriate visibility is ensured. In this time, determine the black insertion ratios so that the black insertion period applied effectively to one display pixel composed of the transmissive pixel PXt and reflective pixel PXr is set to be longer than a predetermined period, for prevention of reverse transition.

FIG. 5B shows the white-display properties of the transmissive part and reflective part, when the intensity of external light is medium.

When the external light intensity is medium, the degrees of contribution of the reflective part and transmissive part to the display characteristic are almost the same, and the black insertion ratios of the reflective part and transmissive part adopt predetermined values. Usually, as the light use ratio of the reflective part is low, the black insertion ratio of the reflective part is set lower than that of the transmissive part, thereby decreasing a brightness loss.

FIG. 5A shows the white-display properties of the transmissive part and reflective part when the intensity of external light is strong.

When the external light intensity is strong, the reflective part contributes to the display property more than the transmissive part. Therefore, the ratio of image display period in one frame is increased by decreasing the black insertion ratio of the reflective part, and the ratio of image display period in one frame is decreased by increasing the black insertion ratio of the transmissive part.

FIG. 5C shows the white-display properties of the transmissive part and reflective part, when the intensity of external light is weak.

When the external light intensity is weak, the transmissive part contributes to the display property more than the reflective part. Therefore, the ratio of image display period in one frame is increased by decreasing the black insertion ratio of the transmissive part, and the ratio of image display period in one frame is decreased by increasing the black insertion ratio of the reflective part.

The above-mentioned black insertion ratios of the transmissive part and reflective part are determined by the driving controller 16 based on the intensity of external light. Namely, the driving controller 16 inputs an external light intensity signal from the external light sensor 17, searches the black insertion ratio setting table of the set value memory 15, and obtains corresponding black insertion ratios of the transmissive part and reflective part.

FIG. 6 shows the contents of a black insertion ratio setting table.

A black insertion ratio At of the transmissive part and a black insertion ratio Ar of the reflective part are set corresponding to an external light intensity I. Here, the user can set a desired value for each of the black insertion rates At and Ar, but from the viewpoint of stabilizing light, set so that the value of At+Ar becomes almost constant.

Black insertion prevents reverse transition of OCB liquid crystal from the bend alignment to the splay alignment, as well as increases the visibility of moving images. Therefore, it is necessary to give a voltage higher than a predetermined value for longer than the predetermined time, and minimum values exist for At and Ar. For example, when one frame frequency is 60 Hz at a room temperature, At and Ar are desirably the times of more than 20% of one frame period. The above-mentioned black insertion ratio setting table sets black insertion ratios suitable for these conditions.

Figure 7:
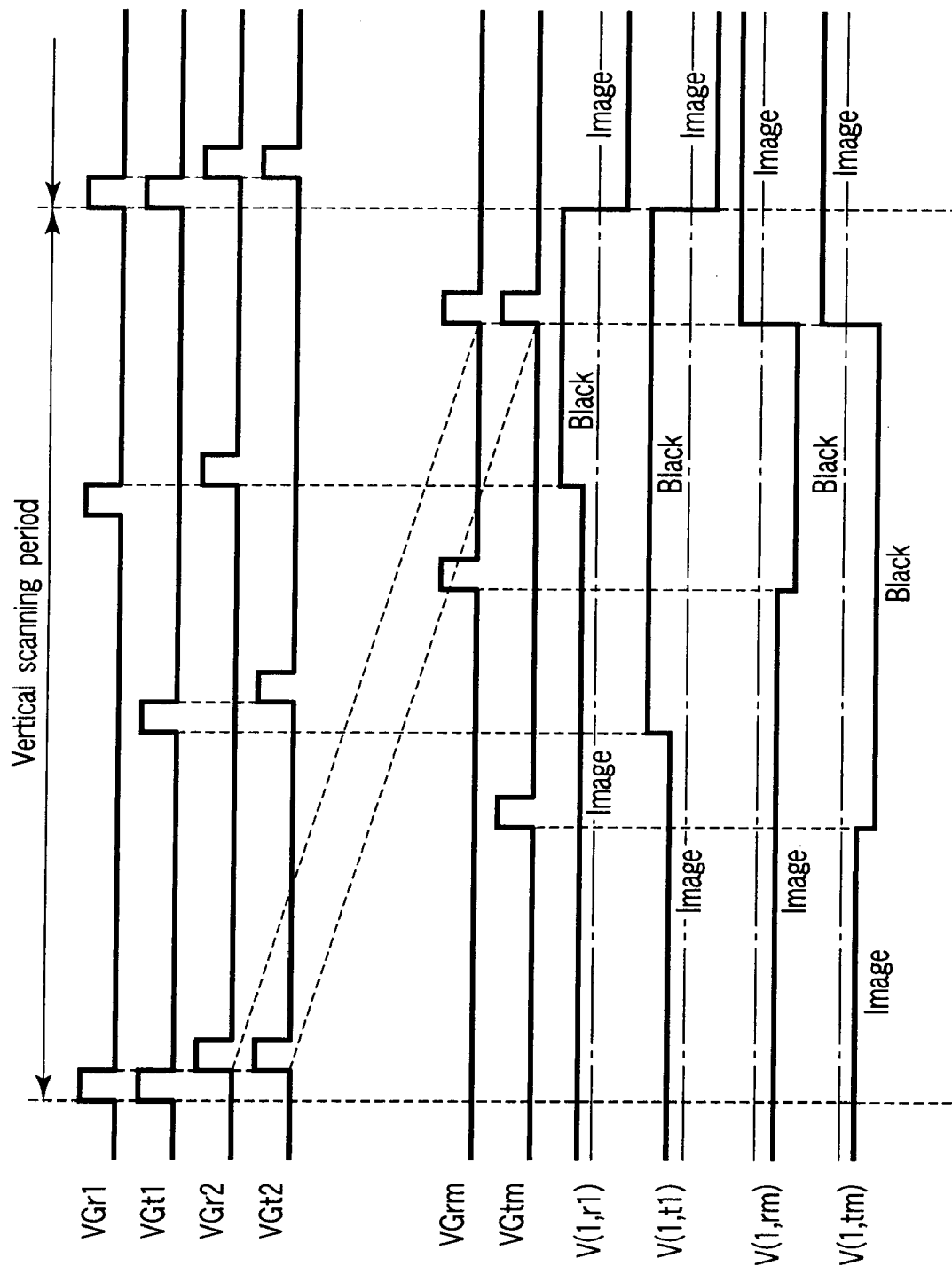
FIG. 7 shows driving waveforms when the apparatus is used under circumstances with strong external light.

FIG. 7 shows driving waveforms when the apparatus is used under circumstances with strong external light. Namely, the black insertion ratio of the reflective part is set smaller than the black insertion ratio of the transmissive part. For example, the black insertion ratio of the reflective part is set to 20%, and the black insertion ratio of the transmissive part is set to 50%.

The scanning voltage VGrn is successively applied to the gate line corresponding to the pixels of the reflective part, and the scanning voltage VGtn is successively applied to the gate line corresponding to the pixels of the transmissive part. Therefore, a corresponding signal voltage is held in each pixel, and images are displayed.

After the scanning voltage VGrn for writing a signal voltage is applied to the gate line corresponding to the pixels of the reflective part, the scanning voltage VGrn is applied again to the gate line after a lapse of a predetermined period, so that the black insertion ratio becomes 20%, and a voltage for black display is written. After the scanning voltage VGrn for writing a signal voltage is applied to the gate line corresponding to the pixels of the transmissive part, the scanning voltage VGrn is applied again to the gate line after a lapse of a predetermined period, so that the black insertion ratio becomes 50%, and a voltage for black display is written.

The black insertion ratio can be changed by controlling the timing of writing the voltage for black display independently for the reflective part and transmissive part.

Further, as the reflective part and transmissive part are controlled based on the electrically independent signal lines, an optimum driving voltage can be set for the voltage-transmissivity properties of the reflective part and transmissive part, and good image display can be realized.

Figure 8:
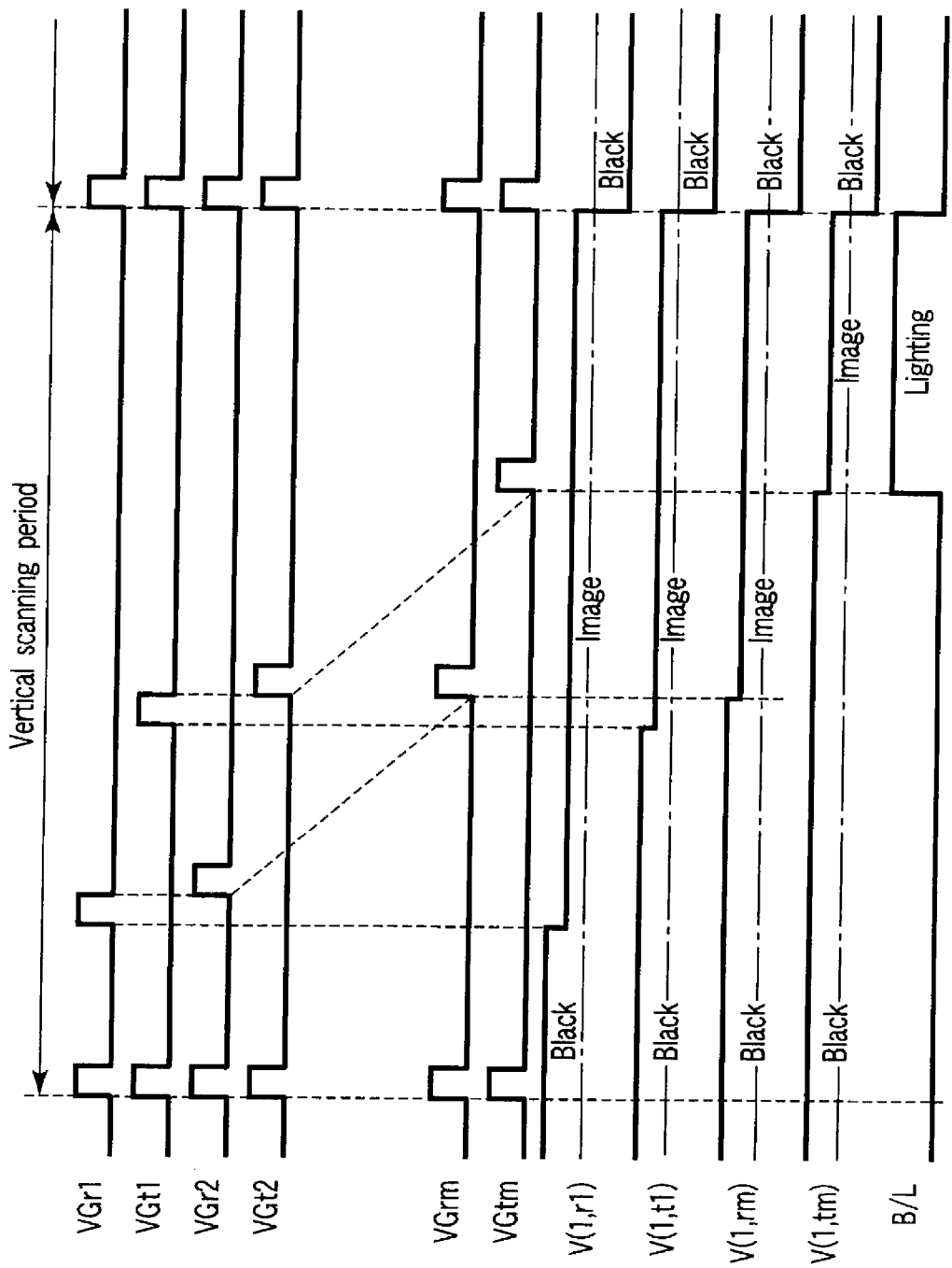
FIG. 8 shows other driving waveforms when the apparatus is used under circumstances with strong external light.

FIG. 8 shows other driving waveforms when the apparatus is used under circumstances with strong external light. Namely, the black insertion ratio of the reflective part is set smaller than the black insertion ratio of the transmissive part. For example, the black insertion ratio of the reflective part is set to 20%, and the black insertion ratio of the transmissive part is set to 50% as in the examples shown in FIG. 7.

In these driving waveforms, unlike the above-mentioned driving waveform, a black-display voltage is applied to the transmissive part and reflective part at the same timing, unlike the above-mentioned driving waveforms.

In the reflective part, the scanning voltage VGrn is successively applied after a certain period, so that the black insertion ratio becomes 20%, and a video signal voltage is applied to a corresponding pixel. Similarly, in the transmissive part, the scanning voltage VGrn is successively applied after a certain period, so that the black insertion ratio becomes 50%, and a video signal voltage is applied to a corresponding pixel.

After the writing of the video signal voltage to the transmissive parties is finished, the backlight is lit and images can be displayed in the transmissive part.

In this driving method, compared with the aforementioned example, the power consumption of the backlight can be decreased by selectively lighting the backlight. Here, the black insertion ratio is controlled by monitoring ambient light as an environmental condition. The black insertion ratio may be controlled based on the battery capacity, for example. Namely, when the battery capacity is decreased to lower than a predetermined value, the black insertion ratio of the reflective part is decreased, and the black insertion ratio of the transmissive part is increased. Thereby, the lighting period of the backlight of the transmissive part can be reduced, and the power consumption can be decreased.

The black insertion ratio may also be controlled based on the ambient temperature of the liquid crystal panel DP. In the OCB mode liquid crystal panel DP, the viscoelasticity of the liquid crystal material is lowered as the temperature is increased, and reverse transition occurs more likely than when the temperature is low. Therefore, it is permitted to control the black insertion ratio to become as high as the temperature of the liquid crystal display panel DP rises, by combining temperature sensors. It is also permitted to control the black voltage upon black insertion to become high as the temperature of the liquid crystal display panel DP rises, by combining temperature sensors.

In the OCB mode liquid crystal panel DP, the voltage (optimum black voltage) for obtaining optimum black display also varies according to ambient temperature. Therefore, it is permitted to set the voltage upon black insertion to the optimum black voltage, according to the temperature of the liquid crystal display panel DP, by combining temperature sensors.

Embodiment 2

A second embodiment is different from the first embodiment in the connection of liquid crystal pixel PX and source line X. Therefore, the same parts as those of the first embodiment are given the same reference numerals, and detailed explanation of these parts will be omitted.

Figure 9:
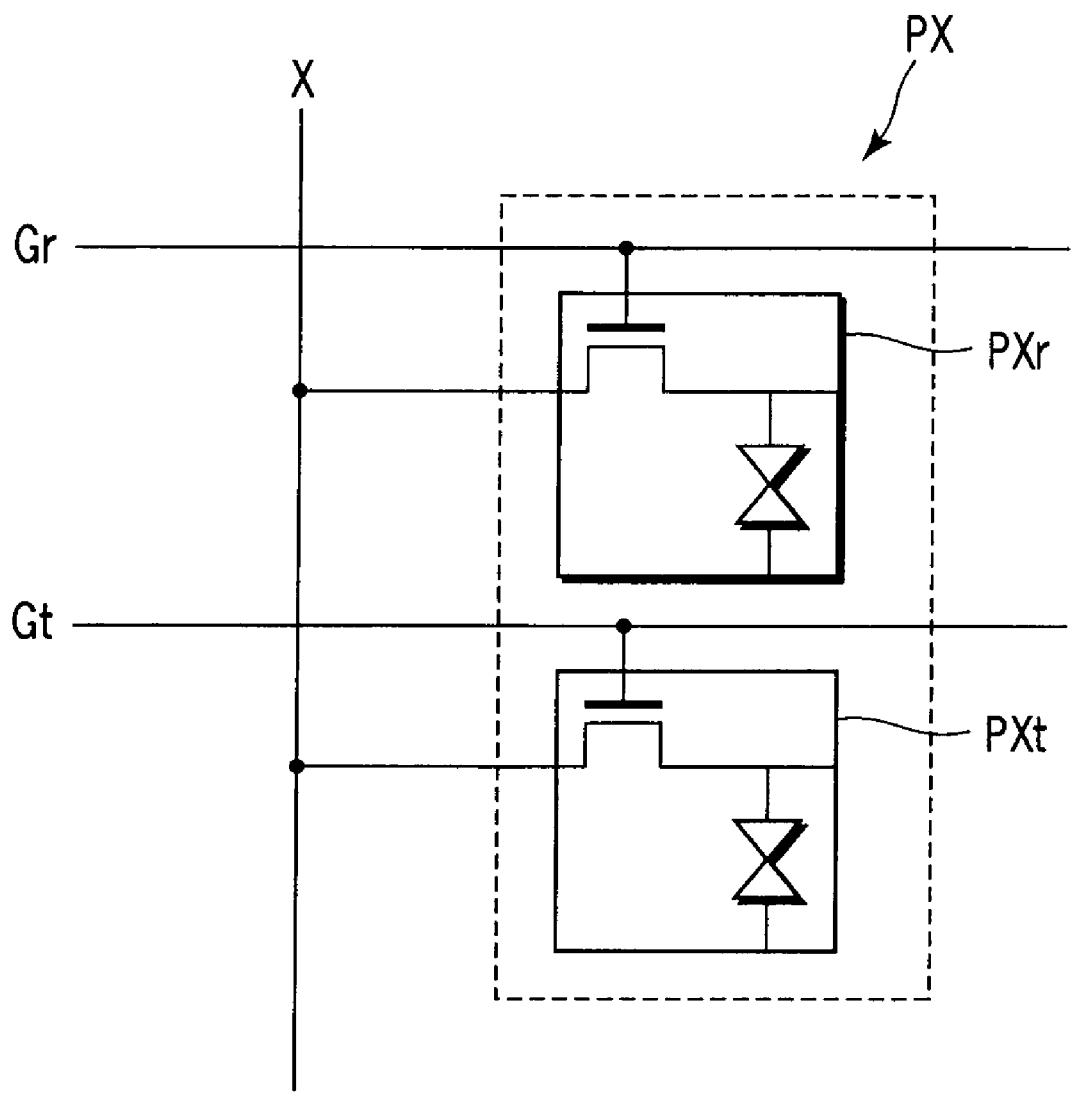
FIG. 9 is a view showing connection of liquid crystal pixels to a gate line and a source line.

FIG. 9 shows connection of liquid crystal pixels to a gate line and a source line.

The OCB liquid crystal pixel PX is a transreflective type liquid crystal pixel, and consists of reflective pixels PXr arranged in an odd line of the liquid crystal display panel DP, and transmissive pixels PXt arranged in an even line. Namely, the transmissive part and reflective part of the OCB liquid crystal pixel are configured independently in one pixel.

The gate line for transmission display Gt and gate line for reflection display Gr are connected to the OCB liquid crystal pixel PX, and drive the transmissive pixel PXt and reflective pixel PXr, respectively. In the first embodiment, the transmissive pixel PXt and reflective pixel PXr are connected by electrically independent signal lines. In the second embodiment, they are controlled by the same signal line. This is the only difference.

Therefore, the number of signal lines can be decreased, and the aperture ratio in the transmissive part can be made larger than that in the first embodiment.

In this case, the same driving as the first embodiment can be realized, by controlling so that the timing of applying the scanning voltages for transmissive pixels and reflective pixels do not match.

It is also permitted for the black writing in the reflective part, signal writing in the reflective part, black writing in the transmissive part, and signal writing in the transmissive part to be performed in a time-shared mode, and the black insertion ratios in the reflective part and transmissive part to be controlled.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transreflective type liquid crystal apparatus comprising:
   a display panel configured to be formed by arranging pixels like a matrix;
   a light source configured to light the display panel; and
   a driving controller configured to control the display panel, wherein
   each of the pixels includes one of red, green or blue color filter and each of the pixels includes a reflective part and a transmissive part driven independently,
   the driving controller is configured to separately control non-image periods of the reflective part and transmissive part, and
   a ratio of the non-image period to one frame period for the transparent pixel is different from a ratio of the non-image period to one frame period for the reflective pixel.

2. The transreflective type liquid crystal apparatus according to claim 1, wherein the driving controller determines non-image periods of the transmissive part and reflective part based on a use environment.

3. The transreflective type liquid crystal apparatus according to claim 2, further comprising an optical sensor configured to measure intensity of external light from environment entering the liquid crystal apparatus, wherein non-image periods of the reflective part and transmissive part are varied according to the external light intensity detected by the optical sensor.

4. The transreflective type liquid crystal apparatus according to claim 1, wherein gradation voltage characteristics are different in the reflective part and transmissive part.

5. The transreflective type liquid crystal apparatus according to claim 1, further comprising a light emission controller configured to control light emission of the light source, wherein the light emission controller makes the light source intermittently emit light according to the non-image period of the transmissive part.

6. A transreflective type liquid crystal display apparatus comprising:
   an OCB liquid crystal display panel configured to be formed by arranging pixels like a matrix;
   a light source configured to light the display panel; and
   a driving controller configured to control the display panel, wherein each of the pixels includes one of red, green or blue color filter, each of the pixels includes a reflective part and a transmissive part driven independently, the driving controller is configured to separately control black insertion ratios of the reflective part and transmissive part, and
   a black insertion ratio of one frame period for the reflective part of a pixel is different from a black insertion ratio of one frame period for the transmissive part of the pixel.

7. A transreflective type liquid crystal display apparatus comprising:
   a display panel having a plurality of pixels arranged in a matrix;
   a light source configured to light the display panel; and
   a driving controller configured to control the display panel, wherein
   each pixel includes one of red, green or blue color filter, a common electrode, a transparent and reflective pixel electrodes, and a liquid crystal layer sandwiched between the common electrode and the transparent and reflective pixel electrodes,
   the driving controller is configured to separately apply a voltage for black display to the transparent pixel electrode and the reflective pixel electrode during non-image periods, and
   a ratio of the non-image period to one frame period for the transparent pixel is different from a ratio of the non-image period to one frame period for the reflective pixel.

8. The transreflective type liquid crystal apparatus according to claim 7, wherein each pixel is an OCB liquid crystal pixel.

9. The transreflective type liquid crystal apparatus according to claim 7, wherein the transparent pixel electrode is connected with a first switching element and the reflective pixel electrode is connected with a second switching element.

10. The transreflective type liquid crystal apparatus according to claim 7, further comprising an optical sensor for measuring an external light intensity.

11. The transreflective type liquid crystal apparatus according to claim 10, wherein the driving controller controls a ratio of the non-image period to one frame period in accordance with an output of the optical sensor.

12. The transreflective type liquid crystal apparatus according to claim 10, wherein the driving controller controls a ratio of the non-image period to one frame period for the transparent pixel to decrease and a ratio of the non-image period to one frame period for the reflective pixel to increase, as the external light intensity becomes stronger.

13. The transreflective type liquid crystal apparatus according to claim 10, wherein the driving controller applies the voltage for black-display to all transparent pixel electrodes and reflective pixel electrodes at a same timing, when the external light intensity is greater or equal to a predetermined value.

14. The transreflective type liquid crystal apparatus according to claim 13, wherein, after a lapse of a predetermined time after the voltage for black-display is applied, the driving controller applies a voltage for a video signal to the transparent pixel electrode and the reflective pixel electrode sequentially, and lights up the light source after writing of the video signal to all transparent pixel electrodes is finished.

15. The transreflective type liquid crystal apparatus according to claim 7, further having a battery, and wherein the driving controller controls a ratio of the non-image period to one frame period for the transparent pixel to increase and a ratio of the non-image display period to one frame period for the reflective pixel to decrease, when a content of the battery becomes smaller than a predetermined value.

16. The transreflective type liquid crystal apparatus according to claim 7, wherein the liquid crystal is an OCB liquid crystal and has a thermometer for measuring a temperature near the display panel, and the driving controller increases a ratio of the non-image period to one frame period for the transparent pixel and a ratio of the non-image display period to one frame period for the reflective pixel in accordance with an increase of the temperature near the display panel.

* * * * *